UNITED STATES PATENT OFFICE.

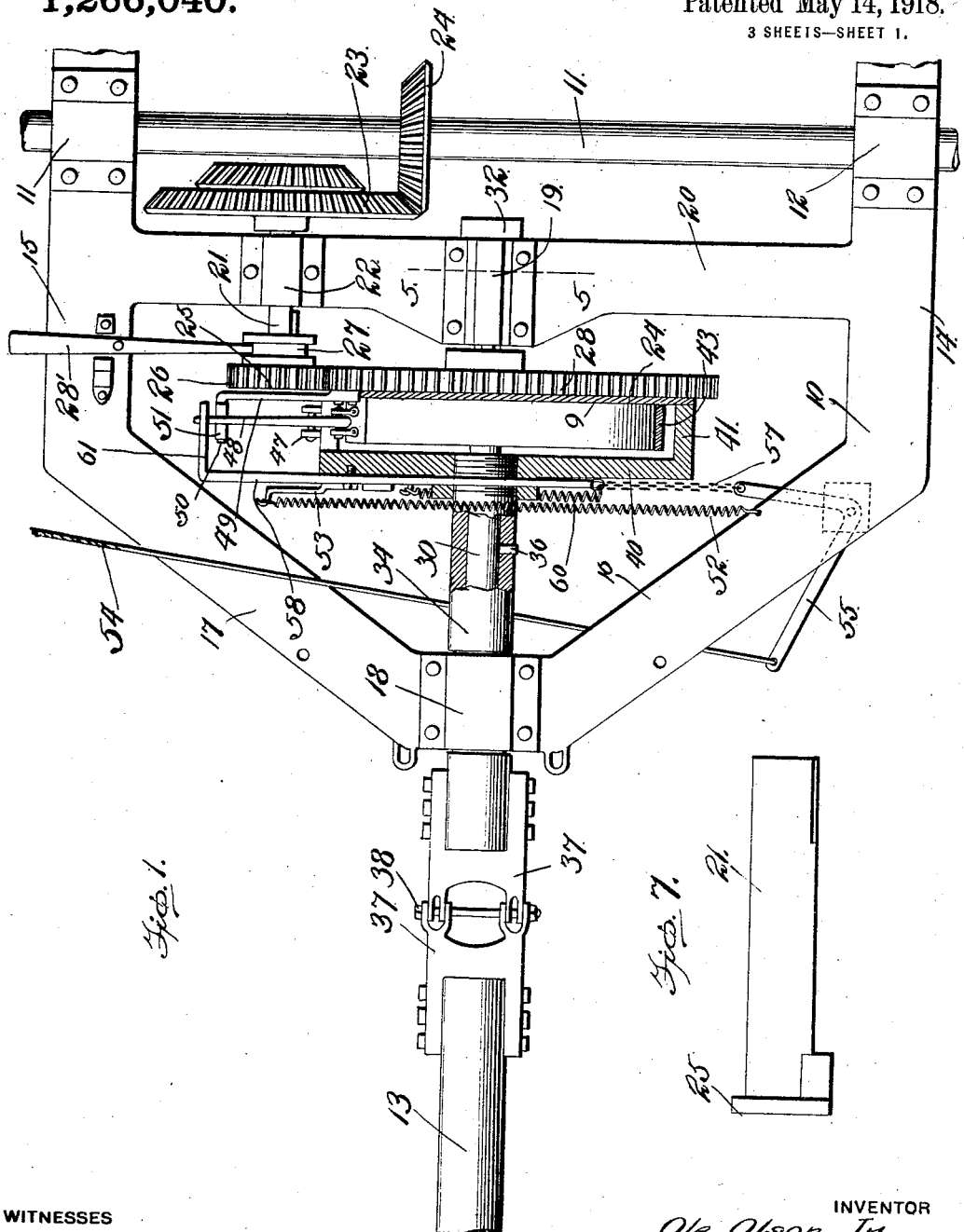

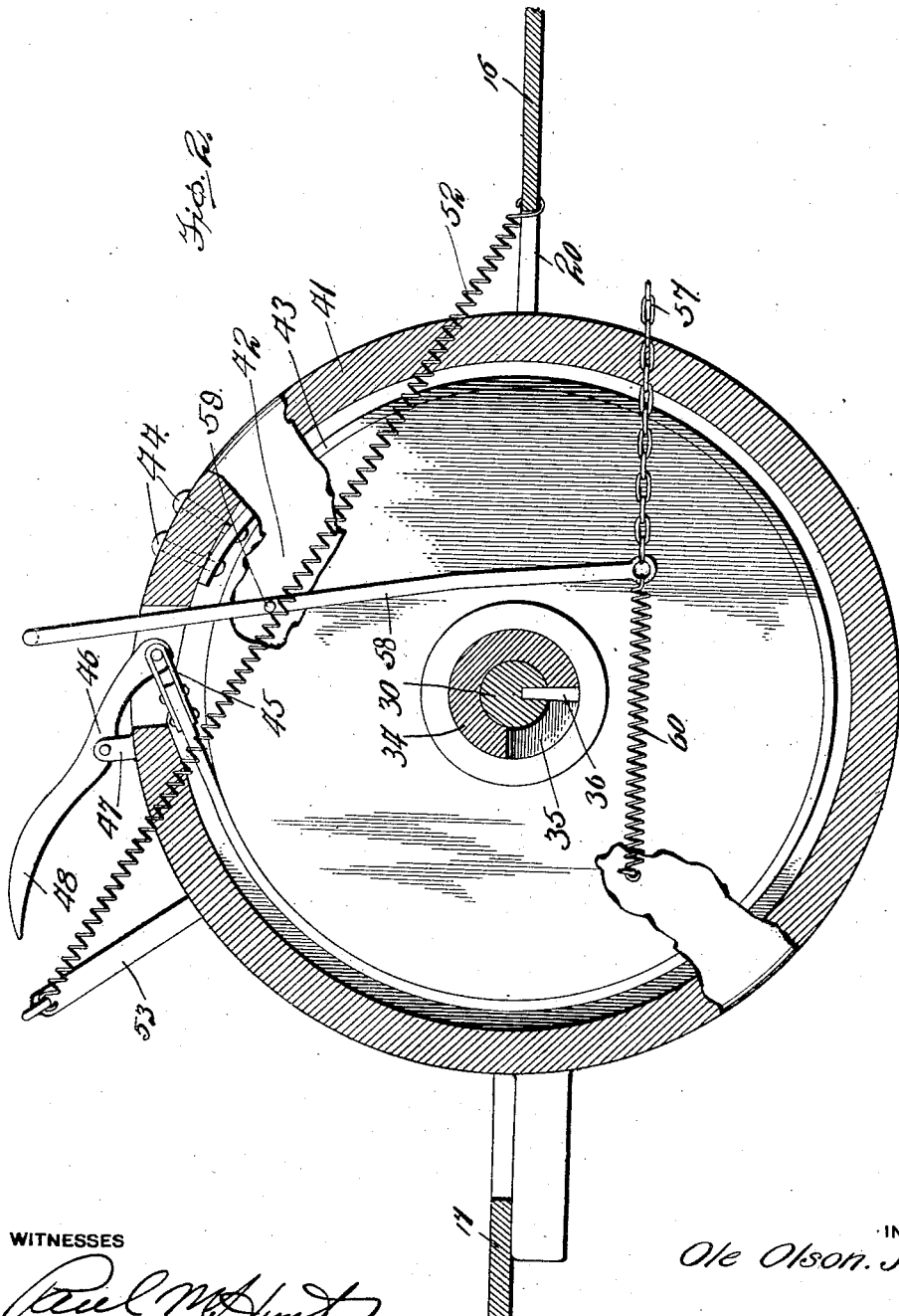

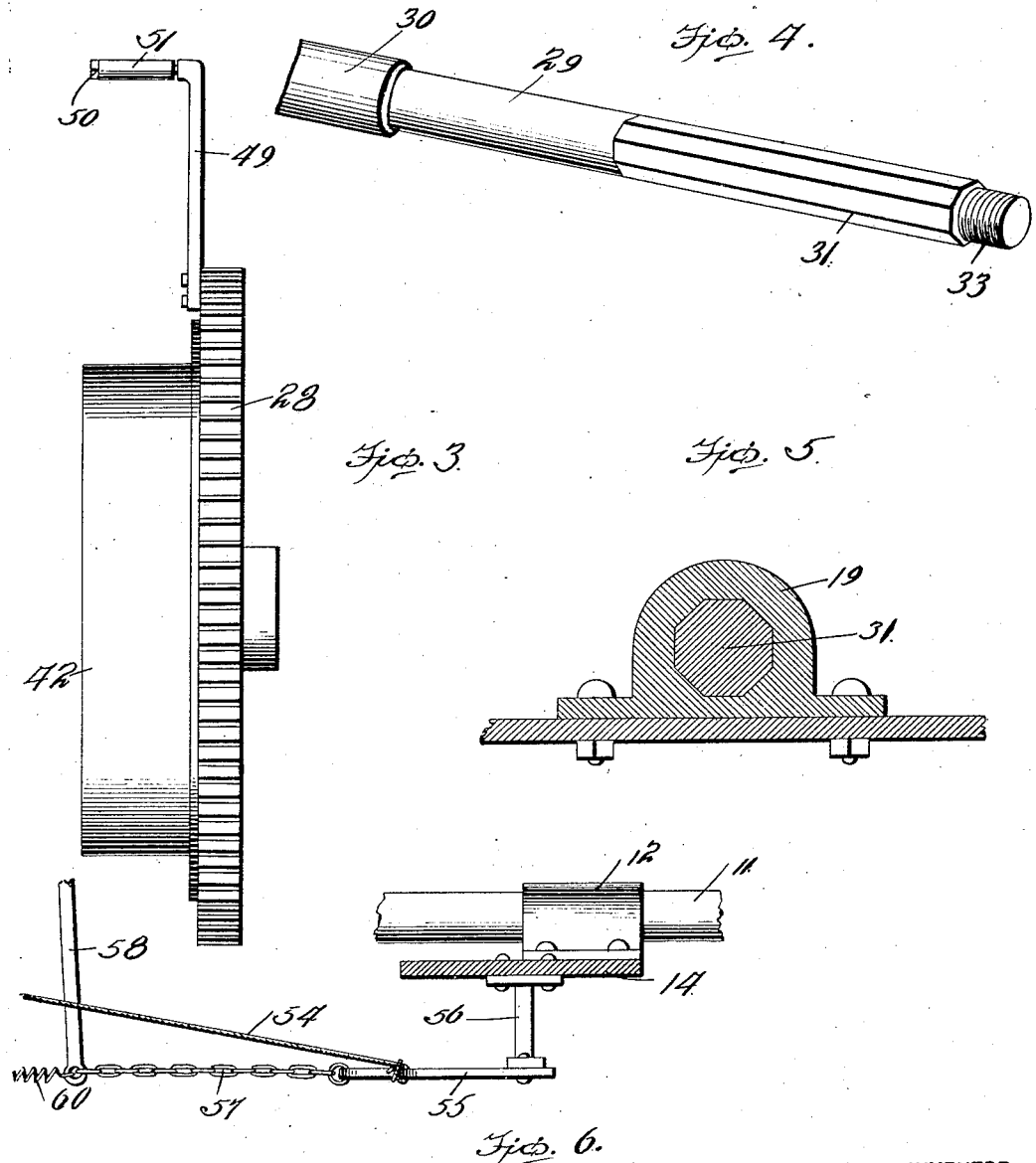

OLE OLSON, JR., OF AVOCA, MINNESOTA.

SELF-DUMPING GEAR FOR HARVESTERS.

1,266,040.              Specification of Letters Patent.     Patented May 14, 1918.

Application filed May 29, 1917.   Serial No. 171,737.

*To all whom it may concern:*

Be it known that I, OLE OLSON, Jr., a citizen of the United States, residing at Avoca, in the county of Murray and State of Minnesota, have invented certain new and useful Improvements in Self-Dumping Gear for Harvesters, of which the following is a specification.

This invention relates to an improved self dumping gear for harvesters and the principal object of the invention is to provide a gear which will be associated with a harvester and which when in operation will cause the bundle carrier of the harvester to automatically dump the bundles at stated intervals.

Another object of the invention is to so construct this dumping gear that it may operate either automatically or manually.

Another object of the invention is to so construct this gear that the movable housing thereof will be yieldably held in a set position and returned to the normal position after having been moved by means of a trip.

Another object of this invention is to provide a gear and carrier so constructed that it may be associated with machines already in use thus making it unnecessary to provide a special construction of harvester.

Another object of the invention is to provide a self-dumping gear which will be comparatively simple in construction and efficient in operation.

This invention is illustrated in the accompanying drawings, wherein:—

Figure 1 is a view showing the improved self-dumping gear in top plan,

Fig. 2 is a sectional view through the gear and carrying frame thereof,

Fig. 3 is a view showing a portion of the gear in side elevation,

Fig. 4 is a perspective view of the shaft upon which the gear is mounted,

Fig. 5 is a sectional view taken along the line 5—5 of Fig. 1,

Fig. 6 is a fragmentary view showing the manner of mounting a lever forming part of the actuating means for manually operating the self-dumping gear, and Fig. 7 is a view in elevation of a shaft carrying a pinion for transmitting rotary movement to the self dumping gear from the sickle drive shaft.

This device will be put in place and associated with the frame or bracket 10 forming part of the frame of the harvester and will be so mounted that rotary motion may be transmitted from the sickle drive shaft 11 mounted in bearings 12 to the shaft 13 leading from an automatic carrier which carrier is not shown but will have a conventional construction for holding a number of bundles and dropping the bundles in a pile upon the field. The frame or bracket indicated in general by the numeral 10 is provided with side bars 14 and 15 which have their end portions 16 converging and meeting to support the bearings 18 positioned in alinement with the bearings 19 carried by the cross bar 20 connecting the side arms 14 and 15. These bearings 18 and 19 are provided so that the self-dumping gear mechanism may be rotatably mounted in the frame or bracket as shown in Fig. 1. A counter-shaft 21 is rotatably mounted in a bearing 22 carried by cross bar 20 and is provided at one end with a bevel gear 23 meshing with a bevel gear 24 carried by the sickle drive shaft 11 and provided at its opposite end with a head 25 fitting into a socket formed in the gear 26 which gear constitutes a clutch element and is provided with a neck 27 engaged by a shifting lever 28′. This clutch gear 26 is keyed to the counter-shaft 21 for longitudinal sliding movement and by moving the shifting lever 28′, the gear clutch may be easily moved into and out of engagement with the head 25 and also into and out of engagement with the large gear 28.

This gear 28 is rotatably mounted upon the reduced and rounded section 29 of the shaft or spindle 30 and when the clutch gear is in the position shown in Fig. 1, rotary motion will be transmitted to the gear 28. The end portion 31 of this spindle 30 is irregular in cross section as shown in Fig. 5 and is mounted in the bearing or socket 19 and held in place by the securing nut 32 screwed upon the threaded end portion 33 of this shaft. The hollow shaft 34 which is rotatably mounted in the bearing 18 receives the spindle 30 and is provided with a transversely extending slot 35 into which extends a pin 36 thus permitting the hollow shaft to have a limited rotary movement upon the spindle. The outer end of this hollow shaft 34 is connected with shaft 13 by the coupling shown in Fig. 1 and consisting of the sections 37 pivotally connected by the connecting bolts 38.

Upon the threaded end portion of the hollow shaft 34, there is mounted a collar or housing 40 having walls 41 extending toward the gear 28 and inclosing the drum extension 42 thereof. A brake strap 43 extends about this brake drum 42 and has one end portion secured to the walls of the housing as shown at 44 and its opposite end portion provided with an eye 45 engaged by a lever 46 pivotally mounted as shown at 47 and having a handle extension 48 curved to provide a cam surface. When this lever 46 is moved to tighten the brake band 43 about the brake drum 42, the housing will be connected with the gear 28 and the housing thus caused to rotate with the gear until the brake is released. A trip rod 49 is secured to the gear 28 and is provided with an outstanding finger 50 carrying a roller 51 which roller engages the cam face of the handle 48 as the gear 28 rotates. It should be noted that this cam face of the handle 48 is so cupped that the roller will first engage the handle and move the lever to tighten the brake band about the drum 42 and after passing the highest point of the cam face will permit the lever to gradually swing to release the brake band. When the lever is moved to tighten the brake band, the housing will be rotated and the hollow shaft will rotate until rotation thereof is stopped by pin 36. By this time, the roller will pass down the curved cam face and release the lever thus permitting the brake band to return to an inoperative position and permit the housing and hollow shaft to be returned to the normal position by action of the return spring 52 one end of which is connected with the frame and the other end of which is connected with the bracket arm 53 extending from the housing. As the gear 28 continues to rotate the abutment will again be brought into engagement with the lever and the brake band tightened. It will thus be seen that the shaft 13 for dumping the bundle carrier will be rotated once every rotation of the gear 28 and thus cause the bundles to be dropped at points even distances apart.

In order to permit the device to be manually operated there is provided a line 54 which line leads from a point adjacent the driver's seat where it may be easily reached and is connected with a bell crank lever 55 pivotally connected with a hanger bracket 56 beneath the frame 10 and having a second arm connected with a chain or other flexible connection 57. This flexible connection or chain 57 is connected with the end of a lever 58 pivoted as at 59 and yieldably held in the position shown in Fig. 2 by means of the spring 60. The free end portion of this lever is bent to provide a finger 61 extending as shown in Fig. 1 so that when the line 54 is pulled by the driver of the harvester, the abutment finger will engage the handle of lever 46 and swing this lever to tighten the brake band. The housing 40 will then be connected with the gear 28 and the shaft 13 will be rotated to dump the bundle carrier. Care must be taken to release the line 54 at the proper time and thus permit the spring 60 to return the lever 58 to the normal position and release the housing thus permitting spring 52 to return the housing to the normal position.

When in use, the harvesting machine will be driven about the field and the grain will be cut and tied into bundles and placed in the bundle carrier in the usual manner. As the machine moves about the field, the gear 28 will be rotated as already described and as this gear rotates, the abutment or trigger 49 will be brought into engagement with the lever 46 once for every rotation of the gear. The bundles will thus be dropped upon the field the same distance apart each trip and can be later set up upon the field. If for any reason it is desired to trip the bundle carrier manually this can be done by drawing upon the line 54 as previously explained. By moving the shifting lever 28' the gear clutch 27 may be moved to the inoperative position and this gear will then be out of mesh with gear 28 thus permitting the machine to travel across a field without the device of this invention operating. I have therefore provided a very efficient device for the purpose described and further have provided one which will be simple in construction and strong and durable and not liable to easily get out of order or need repair.

What is claimed is:—

1. A device of the character described comprising a frame, a driving shaft rotatably connected with the frame, a counter-shaft rotatably connected with the frame and driven from the driving shaft, a clutch gear slidable upon the counter-shaft, a hollow shaft rotatably connected with the frame and provided with a transversely extending slot communicating with its bore, a spindle connected with the frame and extending into the hollow shaft and provided with a pin extending through the slot thereof, a housing mounted upon the hollow shaft, a gear rotatably mounted upon the spindle and positioned for engagement by the clutch gear, a second clutch comprising a drum extending from the last mentioned gear into the housing, a band positioned about the drum and having one end connected with the housing, a lever pivotally connected with the wall of the housing and engaging the free end of the band, resilient means connected with the housing for yieldably holding the same in a set position, and a trigger extending from the gear carrying the drum for engaging the band engaging lever to swing the same and draw the band tightly about the drum and cause the hollow shaft to rotate with the gear.

2. A device of the character described comprising a frame, a driving shaft connected with the frame, a hollow shaft rotatably connected with the frame for operative connection with the tripping shaft of a bundle carrier, a spindle carried by the frame and fitting into the hollow shaft, a pin extending from the spindle through a slot formed in the hollow shaft, a gear carried by the spindle and provided with a drum, a housing carried by the hollow shaft and provided with walls inclosing the drum, a band positioned within the housing about the drum and having one end connected with the wall of the housing, an actuating lever pivotally connected with the housing and engaging the free end of the band, a trip extending from the gear to engage the lever and move the same to bring the brake band into binding engagement with the brake drum, and means for transmitting rotary movement from the driving shaft to the gear.

3. A device of the character described comprising a frame, a driving shaft rotatably connected with the frame, a driven shaft rotatably connected with the frame, a spindle carried by the frame and having operative connection with the driven shaft, a gear carried by the spindle and provided with an extension forming a drum, a housing carried by the driven shaft and inclosing the drum of the gear, clutching means in said housing, an actuating element for the clutching means, means extending from the gear to engage the actuating means and move the clutching means into engagement with the drum as the gear rotates, and means for transmitting rotary movement from the driving shaft to the gear.

4. A device of the character described comprising a frame, a driving shaft carried by the frame, a driven shaft carried by the frame, a spindle carried by the frame and having operative engagement with the driven shaft, a carrier mounted upon the driven shaft, a gear mounted upon the spindle and provided with a drum extending into operative relation to the carrier, means connected with the carrier and having operative engagement with the drum, an actuating element for the said means, means extending from the gear for engaging the actuating element to move the same and bring the first mentioned means into engagement with the drum as the gear rotates, and cause the carrier and driven shaft to rotate with the gear for a portion of a revolution of the gear, and means for transmitting rotary movement from the driving shaft to the gear.

5. A device of the character described comprising a frame, a driving shaft, a driven shaft carried by the frame, a spindle carried by the frame and having operative connection with the driven shaft to permit limited rotation of the driven shaft, a gear carried by the spindle and provided with a drum extension, a carrier mounted upon the driven shaft, clutching means carried by the carrier and extending in operative relation to the drum, actuating means for the clutching means, means connected with the carrier to yieldably hold the carrier and driven shaft against rotation, means extending from the gear to operate the means and cause rotation of the driven shaft, and means for transmitting rotary movement to the drum.

6. A device of the character described comprising a frame, a driven shaft rotatably carried by the frame, a driving shaft carried by the frame, a spindle carried by the frame and having operative connection with the driven shaft to limit rotary movement thereof, a carrier mounted upon the driven shaft, a gear rotatable upon the spindle and provided with a drum extension, means connected with the carrier and extending in operative relation to the drum, an actuating lever for the clutching means carried by the carrier, means extending from the gear to engage the actuating element and move the clutching means into operative engagement with the drum as the gear rotates, means for rotating the gear, an abutment connected with the carrier, means yieldably holding the abutment out of position for engagement with the actuating means for the clutching means, and means for moving the actuating element into position for engagement with the actuating means of the clutching means.

7. A device of the character described comprising a frame, a driven shaft carried by the frame, a driving shaft carried by the frame, a spindle carried by the frame and having operative engagement with the driven shaft to limit rotary movement thereof, a carrier carried by the driven shaft, means connected with the carrier to yieldably hold the carrier and driven shaft against rotation, a gear upon the spindle having a drum extension, clutching means connected with the carrier and extending in operative relation to the drum, an actuating element for the clutching means carried by the carrier, a trip extending from the gear for engaging the actuating element of the clutching means and moving the clutching means to an operative position once with each revolution of the gear, an abutment movably connected with the carrier and extending for engagement with the actuating element, means yieldably holding the abutment out of position for engaging the actuating element, manually operated means for moving the abutment to engage the actuating element of the clutching means, and means for transmitting rotary movement to the gear.

8. A device of the character described comprising a frame, a driven shaft carried by the frame, a drive shaft carried by the frame, a spindle carried by the frame and having operative connection with the driven shaft to limit rotary movement thereof, a carrier mounted upon the driven shaft, a gear having a drum extension upon the spindle, clutch means connected with the carrier in operative position with respect to said drum, an actuating lever for the clutch, means for transmitting rotary movement from the driving shaft to the gear, means extending from the gear to engage the actuating lever and move the clutch means to an operative position once with each revolution of the gear, and manually operated means connected with the carrier, means to normally hold the manually operated means out of position for engagement with the actuating lever and means for moving the same into position for engagement with the actuating lever.

9. A device of the character described comprising a frame, a driven shaft carried by the frame, a drive shaft carried by the frame, a spindle carried by the frame and having operative connection with the driven shaft to limit rotary movement thereof, a drum rotatable upon the spindle, means for transmitting rotary movement from the driving shaft to the drum, a carrier carried by the driven shaft, clutch means carried by the carrier and extending in operative relation to the drum, an actuating lever for the clutch means carried by the carrier, manually operated means connected with the carrier for engaging the actuating lever to move the clutch means into an operative position, including an abutment extending to engage the actuating lever to move the same to bring the clutch means into an operative position.

10. A device of the character described comprising a frame, a driven shaft carried by the frame, a drive shaft carried by the frame, a stationary supporting element having operative connection with the driven shaft to limit rotation thereof, a drum rotatable upon the stationary support, means for transmitting rotary movement from the driving shaft to the drum, a carrier carried by the driven shaft, clutch means carried by the carrier for engaging the drum, manually operated means for bringing the clutch means into an operative position, and means carried by the drum for bringing the clutch means into an operative position once for each revolution of the drum.

In testimony whereof I affix my signature in presence of two witnesses.

OLE OLSON, Jr.

Witnesses:
 ALFRED TERRY,
 W. M. SHARP.

Copies of this patent may be obtained for five cents each, by addressing the "Commissioner of Patents, Washington, D. C."